(12) United States Patent
Koizumi et al.

(10) Patent No.: US 11,139,646 B2
(45) Date of Patent: Oct. 5, 2021

(54) CONDUCTION SYSTEM FOR VEHICLE

(71) Applicant: Yazaki Corporation, Tokyo (JP)

(72) Inventors: Koji Koizumi, Shizuoka (JP);
Masahiro Takamatsu, Shizuoka (JP);
Yoshiaki Ichikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/874,683

(22) Filed: May 15, 2020

(65) Prior Publication Data
US 2020/0389005 A1    Dec. 10, 2020

(30) Foreign Application Priority Data

Jun. 10, 2019    (JP) .............................. JP2019-107839

(51) Int. Cl.
| H02G 5/00 | (2006.01) |
| H01B 7/00 | (2006.01) |
| B60R 16/02 | (2006.01) |
| H01B 13/06 | (2006.01) |
| H01R 11/01 | (2006.01) |

(52) U.S. Cl.
CPC ......... H02G 5/005 (2013.01); B60R 16/0215 (2013.01); H01B 7/0018 (2013.01); H01B 13/06 (2013.01); H01R 11/01 (2013.01)

(58) Field of Classification Search
None
See application file for complete search history.

(56) References Cited

U.S. PATENT DOCUMENTS

| 2,318,859 A | * | 5/1943 | Huguelet | H02G 5/025 |
| | | | | 248/68.1 |
| 4,002,388 A | * | 1/1977 | Menocal | H02B 1/21 |
| | | | | 439/884 |
| 4,245,135 A | * | 1/1981 | Weiss | H02G 5/005 |
| | | | | 174/101 |
| 4,262,163 A | * | 4/1981 | Durrell | H02G 5/005 |
| | | | | 174/33 |
| 4,270,019 A | * | 5/1981 | Thye | H01R 11/01 |
| | | | | 174/32 |
| 4,867,696 A | * | 9/1989 | Demler, Jr. | H02G 5/005 |
| | | | | 439/212 |

(Continued)

FOREIGN PATENT DOCUMENTS

| CN | 106205867 A | * | 12/2016 |
| CN | 107732609 A | * | 2/2018 |

(Continued)

*Primary Examiner* — Timothy J. Dole
*Assistant Examiner* — Muhammed Azam
(74) *Attorney, Agent, or Firm* — Kenealy Vaidya LLP

(57) ABSTRACT

A conduction system includes a laminated busbar including a plurality of busbars forming a conduction path in a vehicle and are stacked each other; and a distribution mechanism configured to distribute an electric power or electric signal by bending a part of the busbars forming the laminated busbar with respect to other busbars and by branching off the part of the busbars and the other busbars branch off from each other. As a result, the conduction system can provide an effect that the conduction path can be properly provided by combining the laminated busbar and the distribution mechanism.

8 Claims, 2 Drawing Sheets

(56) References Cited

U.S. PATENT DOCUMENTS

| | | | | |
|---|---|---|---|---|
| 4,959,019 | A * | 9/1990 | Shimochi | B60R 16/02 439/115 |
| 5,207,591 | A * | 5/1993 | Ozaki | B60R 16/02 439/212 |
| 5,295,847 | A * | 3/1994 | Ozaki | B60R 16/02 439/212 |
| 5,490,794 | A * | 2/1996 | Kobayashi | H01R 9/226 439/212 |
| 5,626,492 | A * | 5/1997 | Onizuka | H01R 9/2458 29/876 |
| 6,024,589 | A * | 2/2000 | Hahn, IV | H05K 1/148 174/71 B |
| 6,203,343 | B1 * | 3/2001 | Chevassus-More | B60R 16/0207 174/72 B |
| 6,238,225 | B1 * | 5/2001 | Middlehurst | H02G 5/005 439/212 |
| 6,325,640 | B1 * | 12/2001 | Kasai | H01R 25/168 174/71 B |
| 6,629,854 | B2 * | 10/2003 | Murakami | H02B 1/20 439/212 |
| 7,869,193 | B2 * | 1/2011 | Nohara | H02M 5/271 361/624 |
| 8,299,360 | B2 * | 10/2012 | Sato | H01R 25/00 174/68.2 |
| 8,717,741 | B2 * | 5/2014 | Valenzuela | H02B 13/005 361/611 |
| 9,006,571 | B2 * | 4/2015 | Manhart | H02G 5/02 174/71 B |
| 9,238,441 | B2 * | 1/2016 | Fussl | B60R 16/02 |
| 9,620,263 | B2 * | 4/2017 | Ogawa | H01B 7/30 |
| 9,685,715 | B2 * | 6/2017 | Yamauchi | H01M 8/2465 |
| 9,825,377 | B2 * | 11/2017 | Nishikawa | H01R 3/08 |
| 9,853,435 | B1 * | 12/2017 | Burkman | H01M 10/625 |
| 10,243,191 | B2 * | 3/2019 | Mattmuller | H01R 9/18 |
| 10,305,203 | B2 * | 5/2019 | Murakami | B23K 31/02 |
| 10,312,678 | B1 * | 6/2019 | Wiant | H01R 25/162 |
| 10,315,592 | B2 * | 6/2019 | Osada | H01B 9/003 |
| 10,381,751 | B2 * | 8/2019 | Sayo | H01R 7/08 |
| 10,686,309 | B2 * | 6/2020 | Fukuhara | H01R 9/2458 |
| 2001/0012736 | A1 * | 8/2001 | Miyajima | H05K 3/326 439/721 |
| 2001/0025718 | A1 * | 10/2001 | Maruyama | H05K 3/202 174/72 B |
| 2001/0027872 | A1 * | 10/2001 | Wagener | H02G 5/00 174/71 B |
| 2010/0177464 | A1 * | 7/2010 | Strong | H02G 5/005 361/624 |
| 2011/0308834 | A1 * | 12/2011 | Takahashi | H02M 7/003 174/68.2 |
| 2012/0302110 | A1 * | 11/2012 | Altrichter | H01R 25/162 439/884 |
| 2012/0305283 | A1 * | 12/2012 | Kalayjian | H01B 13/0036 174/68.2 |
| 2013/0068495 | A1 * | 3/2013 | Hadi | H01R 25/14 174/68.2 |
| 2014/0000927 | A1 * | 1/2014 | Hashimoto | H02G 5/005 174/68.2 |
| 2014/0116751 | A1 * | 5/2014 | Hatori | B29C 70/84 174/129 B |
| 2014/0321090 | A1 * | 10/2014 | Guerin | H01G 9/26 361/782 |
| 2014/0342585 | A1 * | 11/2014 | Benedetti | H02G 5/02 439/110 |
| 2014/0370339 | A1 * | 12/2014 | Kim | H01M 50/502 429/72 |
| 2016/0144808 | A1 * | 5/2016 | Date | H02G 3/0481 174/72 A |
| 2016/0217884 | A1 * | 7/2016 | Harwath | H01B 7/0009 |
| 2018/0040392 | A1 * | 2/2018 | Fujiwara | H01B 5/02 |
| 2018/0047958 | A1 | 2/2018 | Sato et al. | |
| 2018/0097322 | A1 * | 4/2018 | Harris, III | H01M 50/502 |
| 2018/0148855 | A1 * | 5/2018 | Nakagawa | C25D 13/04 |
| 2018/0174716 | A1 * | 6/2018 | Kominato | B21D 7/14 |
| 2018/0309281 | A1 * | 10/2018 | Ichikawa | H01M 50/502 |
| 2018/0315517 | A1 * | 11/2018 | Fukawa | C22C 21/02 |
| 2018/0316146 | A1 * | 11/2018 | Kato | H01R 25/161 |
| 2019/0036283 | A1 * | 1/2019 | Jordan | H02G 5/10 |
| 2019/0126860 | A1 * | 5/2019 | Takamatsu | B60R 16/0215 |
| 2019/0126862 | A1 * | 5/2019 | Sasaki | B60R 16/0215 |
| 2019/0173216 | A1 * | 6/2019 | Sunaga | H01R 12/58 |
| 2019/0181599 | A1 * | 6/2019 | Guillanton | H01M 50/502 |
| 2019/0305446 | A1 * | 10/2019 | Kawamura | H01R 25/162 |
| 2019/0348720 | A1 * | 11/2019 | Oh | H01M 50/20 |
| 2019/0348828 | A1 * | 11/2019 | Preising | H02G 5/005 |
| 2019/0356121 | A1 * | 11/2019 | Shiraki | H01R 11/05 |
| 2020/0194977 | A1 * | 6/2020 | Furco | H02B 1/46 |
| 2020/0273599 | A1 * | 8/2020 | Imamura | H01R 9/00 |
| 2020/0389005 | A1 * | 12/2020 | Koizumi | B60R 16/0215 |

FOREIGN PATENT DOCUMENTS

| | | | | |
|---|---|---|---|---|
| CN | 108349447 A | * | 7/2018 | H01B 5/02 |
| CN | 108735958 A | * | 11/2018 | H01M 10/6553 |
| DE | 102018218629 A1 | * | 4/2020 | G01D 11/245 |
| EP | 2 571 119 A2 | | 3/2013 | |
| FR | 2558652 A1 | * | 7/1985 | H01R 12/57 |
| JP | 2004227806 A | * | 8/2004 | H02G 5/005 |
| JP | 2012-182047 A | | 9/2012 | |
| KR | 20170068371 A | * | 6/2017 | |
| WO | WO-2012118047 A1 | * | 9/2012 | H01M 10/6553 |

\* cited by examiner

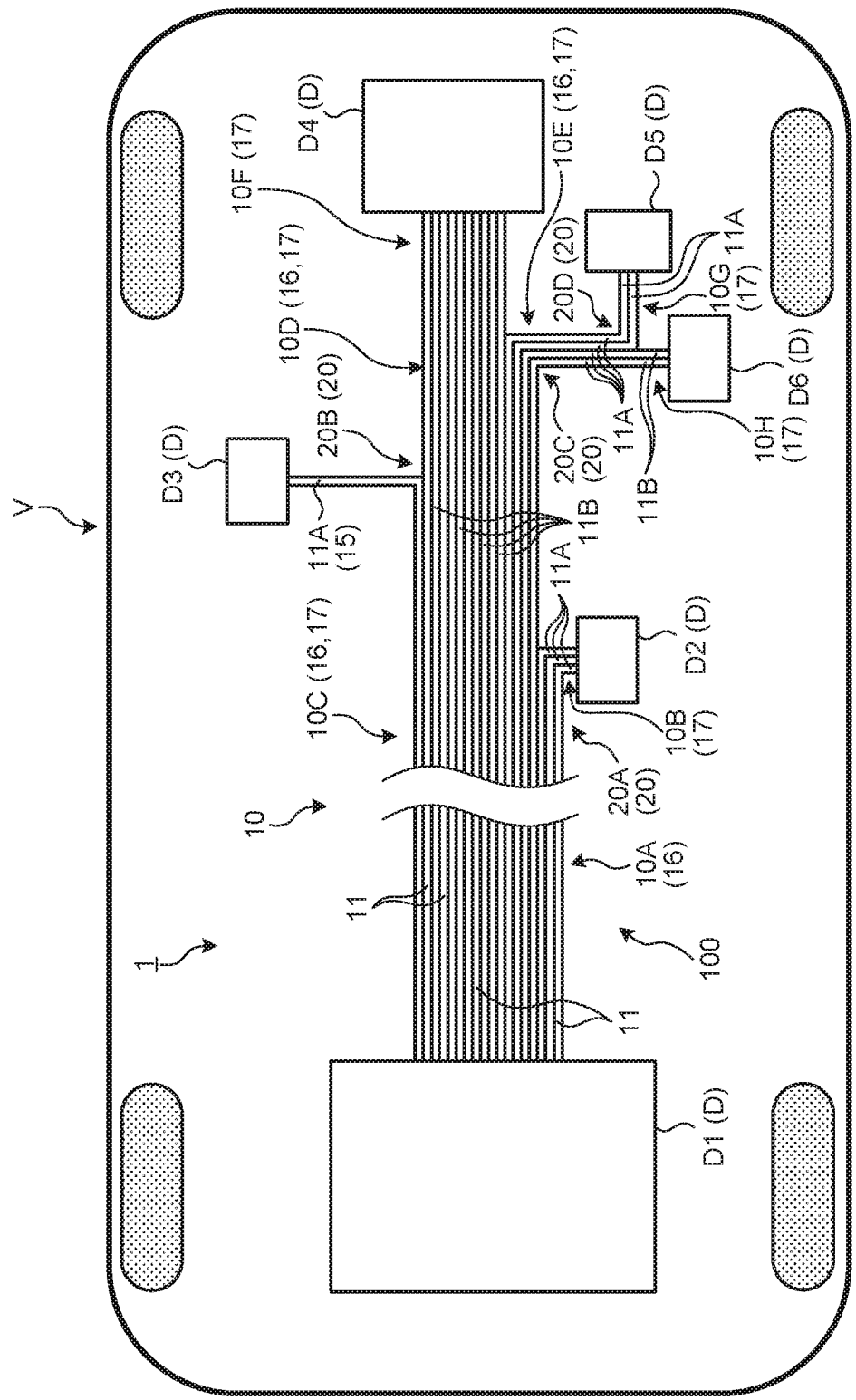

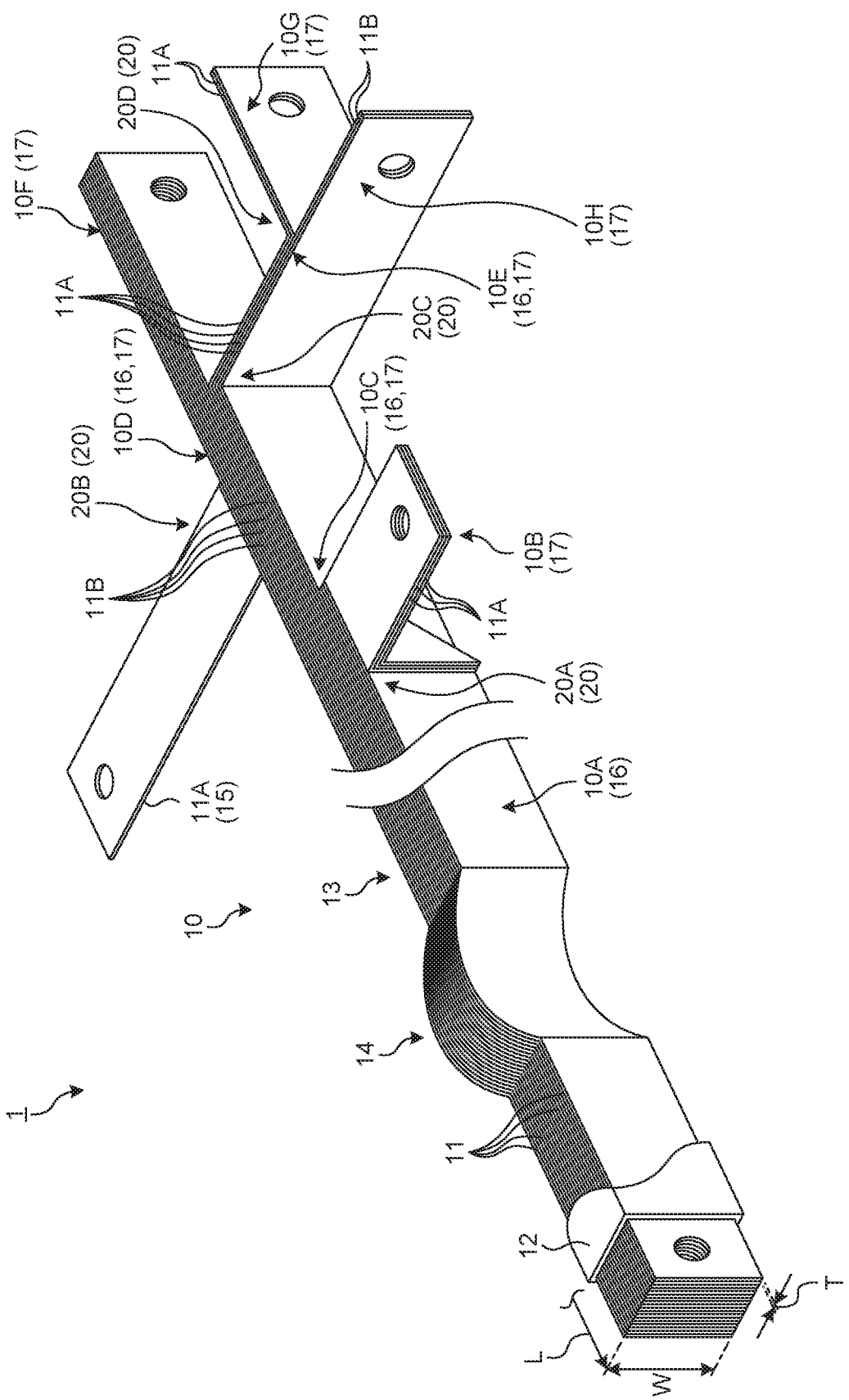

CONDUCTION SYSTEM FOR VEHICLE

CROSS-REFERENCE TO RELATED APPLICATION(S)

The present application claims priority to and incorporates by reference the entire contents of Japanese Patent Application No. 2019-107839 filed in Japan on Jun. 10, 2019.

BACKGROUND OF THE INVENTION

1. Field of the Invention

The present invention relates to a conduction system.

2. Description of the Related Art

As a technique relating to a conduction system forming a conduction path in a vehicle, for example, Japanese Patent Application Laid-open No. 2012-182047 discloses a busbar set including a plurality of multiplex busbars and an insulation member. In the plurality of multiplex busbars, an intermediate portion which is a portion having a structure where a plurality of conductors having a plate shape overlap each other, and a terminal portion which is a portion that is made of a conductor connected to both ends of the intermediate portion and is connected to other members are formed. The insulation member is made of an insulator that is molded into a flat outer shape and has flexibility, and is integrally connected to the intermediate portion while covering the intermediate portion of the plurality of multiplex busbars that are arranged in parallel along one plane with a gap therebetween.

By the way, the busbar set described in Japanese Patent Application Laid-open No. 2012-182047 has rooms for further improvement, for example, in that a conduction path which conducts an electric power or electric signal can be more properly laid in the vehicle.

SUMMARY OF THE INVENTION

The present invention has been made in light of the foregoing circumstances, and an object of the present invention is to provide a conduction system in which a conduction path can be properly provided.

In order to achieve the above mentioned object, a conduction system according to one aspect of the present invention includes a laminated busbar including a plurality of busbars that form a conduction path in a vehicle and are stacked each other; and a distribution mechanism configured to distribute an electric power or electric signal by bending a part of the busbars forming the laminated busbar with respect to other busbars and by branching off the part of the busbars and the other busbars from each other.

According to another aspect of the present invention, in the conduction system, it is possible to configure that in the laminated busbar, at least a part of the plurality of busbars forming the laminated busbar is in contact with the busbar adjacent thereto to conduct electricity.

According to still another aspect of the present invention, in the conduction system, it is possible to configure that the distribution mechanism distributes an electric power, and the number of the part of the busbars and the number of the other busbars are determined according to a current value required by a distribution destination of the electric power.

According to still another aspect of the present invention, in the conduction system, it is possible to configure that a plurality of the distribution mechanisms are provided, the laminated busbar includes a branch destination laminated busbar that branches off via the distribution mechanism, and the branch destination laminated busbar further branches off via another distribution mechanism.

According to still another aspect of the present invention, in the conduction system, it is possible to configure that the laminated busbar includes a path restriction portion in which at least a part of the plurality of busbars forming the laminated busbar is non-displaceable relative to the busbar adjacent thereto, and a deformation allowance portion in which at least a part of the plurality of busbars forming the laminated busbar is displaceable relative to the busbar adjacent thereto, the path restriction portion has a higher rigidity than that of the deformation allowance portion, to restrict an installation path of the laminated busbar, and the deformation allowance portion has a higher flexibility than that of the path restriction portion, to allow a deformation of the laminated busbar.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic block diagram illustrating a schematic configuration of a vehicle to which a conduction system according to an embodiment is applied; and FIG. 2 is a schematic perspective view illustrating a schematic configuration of the conduction system according to the embodiment.

DETAILED DESCRIPTION OF THE PREFERRED EMBODIMENTS

Hereinafter, an embodiment according to the present invention will be described in detail based on the drawings. Incidentally, the present invention is not limited by the embodiment. In addition, the following embodiment includes components which are easily replaceable by those skilled in the art, or substantially the same components.

Embodiment

A conduction system 1 of the present embodiment illustrated in FIGS. 1 and 2 is a structural electric module that is applied to a vehicle V and connects between various devices mounted in the vehicle V to be used for electric power supply or signal communication. The conduction system 1 transmits an electric power or electric signal to various devices D mounted in the vehicle V. The conduction system 1 of the present embodiment includes a laminated busbar 10 and a distribution mechanism 20. A conduction path 100 can be properly provided in the vehicle V by combining the laminated busbar 10 and the distribution mechanism 20. Hereinafter, the configuration of the conduction system 1 will be described in detail with reference to each drawing.

The laminated busbar 10 is a laminate body formed by stacking a plurality of busbars 11. The busbars 11 are conductors that form the conduction path 100 in the vehicle V. The conduction path 100 formed by the busbars 11 forms a transmission path that is connected to the various devices D to conduct electricity in the vehicle V. Typically, the conduction path 100 forms a power supply system transmission path that transmits an electric power to drive the device D, or a communication system transmission path that transmits an electric signal which is input to and output from the device D. Each of the plurality of busbars 11 forms the conduction path 100.

Specifically, the busbar 11 is made of a metallic material having conductivity, for example, copper, a copper alloy, aluminum, an aluminum alloy, or the like. The busbar 11 is a flat plate-shaped conductor that is formed into the shape of a substantially rectangular plate. The busbar 11 extends along the conduction path 100, and the shape of the cross-section of the busbar 11 which is orthogonal to an extension direction is a substantially rectangular shape. The busbar 11 is formed extending such that the cross-section is substantially the same in the extension direction. The busbar 11 is formed such that a thickness T of the busbar 11 along a thickness direction (short side direction in the foregoing shape of the cross-section) is remarkably smaller compared to a length L thereof along the extension direction or a width W thereof along a width direction (long side direction in the foregoing shape of the cross-section). Here, the busbar 11 is typically formed into the shape of a thin sheet (foil shape) having flexibility. The busbar 11 is typically formed as a long component extending in the shape of a band between the various devices D. The plurality of busbars 11 are stacked in an overlapping manner along the thickness direction to form the laminated busbar 10.

The laminated busbar 10 is formed by stacking a large number of the busbars 11. Typically, the plurality of busbars 11 forming the laminated busbar 10 are made of the same material, and are formed such that the cross-sections orthogonal to the extension direction have the same shape (namely, the thickness T and the width W are the same). The extension directions, the thickness directions, and the width directions of the plurality of busbars 11 which are stacked one on top of the other to form the laminated busbar 10 coincide with each other.

In the laminated busbar 10, at least a part of the plurality of busbars 11 forming the laminated busbar 10 is in contact with the busbar 11 adjacent thereto to conduct electricity. In the laminated busbar 10 of the present embodiment, the busbars 11 adjacent to each other are in contact with each other to conduct electricity in a state where all of the busbars 11 forming the laminated busbar 10 are stacked. Namely, the laminated busbar 10 of the present embodiment is formed such that all of the busbars 11 forming the laminated busbar 10 have the same electrical potential.

An insulation coating portion 12 may be applied to the entirety or a part of the laminated busbar 10. The insulation coating portion 12 is made of a resin material having insulating properties, and is a busbar coating that is provided in contact with outer surfaces of the plurality of stacked busbars 11 to cover the outer surfaces of the plurality of busbars 11. The insulation coating portion 12 of the present embodiment is provided not to be interposed between the busbars 11 adjacent to each other in the plurality of stacked busbars 11. The insulation coating portion 12 is formed, for example, by performing extrusion molding of a resin material (polypropylene (PP), polyvinyl chloride (PVC), cross-linked polyethylene (PE), or the like, and is appropriately selected taking into consideration wear resistance, chemical resistance, heat resistance, and the like) on an outer surface side of the plurality of stacked busbars 11. In addition, the insulation coating portion 12 may be formed, for example, by a dipping process of dipping the plurality of stacked busbars 11 in a resin material to apply a coating thereto. In addition, the insulation coating portion 12 may be formed, for example, by a spray process of spraying a resin material to the plurality of stacked busbars 11 to apply a coating thereto. In addition, the insulation coating portion 12 may be formed, for example, by mounting a heat shrinkable tube on the outer surfaces of the plurality of stacked busbars 11, the heat shrinkable tube being formed into a tubular shape from a resin material, and heating the heat shrinkable tube to apply heat to and shrink the heat shrinkable tube. Incidentally, for example, in a case where the conduction path 100 forms a communication system transmission path, the insulation coating portion 12 may be provided to be interposed and insulate between the busbars 11 adjacent to each other in the plurality of stacked busbars 11.

The laminated busbar 10 may be configured to include a path restriction portion 13 and a deformation allowance portion 14. In the laminated busbar 10, since the path restriction portion 13 and the deformation allowance portion 14 are properly used according to the installation position or the like in the vehicle V, it is possible to realize a balance between proper flexibility and proper rigidity required by each portion; and thereby, it is possible to secure good workability, good handleability, or the like.

The path restriction portion 13 is a portion of the laminated busbar 10 in which at least a part of the plurality of busbars 11 forming the laminated busbar 10 is non-displaceable relative to the busbar 11 adjacent thereto. Typically, the busbars 11 adjacent to each other in the path restriction portion 13 are non-displaceable relative to each other in a state where all of the busbars 11 forming the laminated busbar 10 are stacked. The busbars 11 adjacent to each other in the path restriction portion 13 are fixed to be non-displaceable relative to each other and integrated by various techniques such as heat welding, ultrasonic joining, bonding by an adhesive having conductivity, coating, and thermal caulking. According to this configuration, the path restriction portion 13 has a higher rigidity than that of the deformation allowance portion 14, and typically serves as a portion that restricts the installation path of the laminated busbar. Since the path restriction portion 13 is formed into a shape corresponding to the installation path thereof in the vehicle V, the path restriction portion 13 can restricts the installation path of the laminated busbar 10, in other words, has a good shape-retaining function.

On the other hand, the deformation allowance portion 14 is a portion of the laminated busbar 10 in which at least a part of the plurality of busbars 11 forming the laminated busbar 10 is displaceable relative to the busbar 11 adjacent thereto. Typically, the busbars 11 adjacent to each other in the deformation allowance portion 14 are displaceable relative to each other in a state where all of the busbars 11 forming the laminated busbar 10 are stacked. The foregoing heat welding, ultrasonic joining, bonding by an adhesive having conductivity, coating, thermal caulking, or the like is not applied to the deformation allowance portion 14, so that the busbars 11 adjacent to each other become flexible in the deformation allowance portion 14. According to this configuration, the deformation allowance portion 14 has a higher flexibility than that of the path restriction portion 13, and serves as, for example, a portion that allows the laminated busbar 10 to be deformed along the thickness direction of the busbar 11. Since a deformation of the laminated busbar 10 is allowed when the laminated busbar 10 is installed in the vehicle V, the deformation allowance portion 14 can improve installation workability, in other words, has a relatively good shape-deforming function.

The distribution mechanism 20 forms a portion in which a part of the busbars 11 forming the laminated busbar 10 is bent with respect to other busbars 11 and the part of the busbars 11 and the other busbars 11 branch off from each other to distribute an electric power or electric signal to the device D connected to each of the busbars 11. In other words, the distribution mechanism 20 is a portion in which a part of the busbars 11 forming the laminated busbar 10 is bent with respect to other busbars 11 and the part of the busbars 11 and the other busbars 11 branch off from each other to cause the conduction path 100 to branch off. In a case where the conduction path 100 forms a power supply system transmission path, the distribution mechanism 20 serves as a power supply distribution portion that distributes an electric power from a power supply to the device D connected to the busbar 11. In a case where the conduction path 100 forms a communication system transmission path, the distribution mechanism 20 serves as a signal distribution portion that distributes an electric signal to the device D connected to the busbar 11. The conduction system 1 illustrated as an example in FIGS. 1 and 2 includes a total of four distribution mechanisms 20 which are a distribution mechanism 20A, a distribution mechanism 20B, a distribution mechanism 20C, and a distribution mechanism 20D.

Incidentally, in the following description, when there is no particular need to distinctively describe the four distribution mechanisms 20A, 20B, 20C, and 20D, the distribution mechanism 20A, 20B, 20C, or 20D may be simply referred to as the "distribution mechanism 20". In addition, in the following description, the busbar 11 (a part of the busbars 11 forming the laminated busbar 10) which is bent to branch off in each of the distribution mechanisms 20 may be referred to as a "bent branch busbar 11A". Similarly, the busbar 11 (other busbar 11 forming the laminated busbar 10) which branches off without being bent in each of the distribution mechanisms 20 may be referred to as a "straight branch busbar 11B". The bent branch busbar 11A is bent in the distribution mechanism 20 to be formed such that the thickness direction of the bent branch busbar 11A is a different direction from the thickness direction of the straight branch busbar 11B.

In each of the distribution mechanisms 20, the number of the bent branch busbars 11A which are bent to branch off and the number of the straight branch busbars 11B which branch off without being bent may be a single numeral or a plural numeral. In the distribution mechanism 20, typically, the number of the bent branch busbars 11A and the number of the straight branch busbars 11B are determined according to the requirement of the device D connected to a distribution destination (branch destination).

For example, in a case where the conduction path 100 forms a power supply system transmission path, the distribution mechanism 20 serves as a power supply distribution portion to distribute an electric power to the device D. In this case, in the distribution mechanism 20, the number of the bent branch busbars 11A and the number of the straight branch busbars 11B are determined according to the current value required by the device D connected to a distribution destination of the electric power. The number of the busbars 11 which branch off in the distribution mechanism 20 relatively increases as the current value required by the device D connected to a branch destination (distribution destination) of each of the busbars 11 relatively increases, and the number of the busbars 11 relatively decreases as the current value relatively decreases. Namely, when the current values required by the devices D at the distribution destinations differ from each other, the numbers of the busbars 11 which branch off in the distribution mechanisms 20 differ from each other, namely, in the distribution mechanisms 20, the numbers of the bent branch busbars 11A differ from each other, and the numbers of the straight branch busbars 11B differ from each other. For example, as described above, when the busbars 11 are made of the same material and are formed such that the cross-sections orthogonal to the extension direction have the same shape, the current value required at a distribution destination (branch destination) and the number of busbars 11 which branch off in the distribution mechanism 20 related thereto are in a proportional relationship. In this case, for example, in a case where one sheet of the busbar 11 can correspond to 5 A, when the current value required by a distribution destination of the electric power is 15 A, the number of the busbars 11 which branch off in the distribution mechanism 20 is three, and when the current value is 20 A, the number of the busbars 11 is four.

On the other hand, for example, when the conduction path 100 forms a communication system transmission path, the distribution mechanism 20 serves as a signal distribution portion to distribute an electric signal to the device D. In this case, in the distribution mechanism 20, the number of the bent branch busbars 11A and the number of the straight branch busbars 11B are determined according to the number of signal lines required by the device D connected to a distribution destination of the electric signal. Namely, when the numbers of signal lines required by the devices D at the distribution destinations differ from each other, the numbers of the busbars 11 which branch off in the distribution mechanisms 20 differ from each other, namely, in the distribution mechanisms 20, the numbers of the bent branch busbars 11A differ from each other, and the numbers of the straight branch busbars 11B differ from each other.

Incidentally, as described above, the number of the bent branch busbars 11A and the number of the straight branch busbars 11B may be a single numeral or a plural numeral. When each of the number of the bent branch busbars 11A and the number of the straight branch busbars 11B is a single numeral, a branch destination single-layer busbar 15 is formed. Similarly to the laminated busbar 10, the insulation coating portion 12 or the like may be applied to the branch destination single-layer busbar 15. On the other hand, when each of the number of the bent branch busbars 11A and the number of the straight branch busbars 11B is a plural numeral, a branch destination laminated busbar 17 is formed. The branch destination laminated busbar 17 branches off from a branch origin laminated busbar 16 which is a branch origin, via the distribution mechanism 20, and is formed by stacking the plurality of busbars 11 (the bent branch busbars 11A and the straight branch busbars 11B) at a branch destination. Namely, the laminated busbar 10 of the present embodiment is configured to include the branch origin laminated busbar 16 which is a branch origin in the distribution mechanism 20, and the branch destination laminated busbar 17 which is a branch destination in the distribution mechanism 20. Then, the branch destination laminated busbar 17 becomes the branch origin laminated busbar 16 in another distribution mechanism 20 to be able to further branch off via the another distribution mechanism 20.

A specific example will be described based on the conduction system 1 illustrated as an example in FIGS. 1 and 2. Incidentally, the laminated busbar 10 illustrated as an example in FIGS. 1 and 2 includes a plurality of laminated busbars 10A, 10B, 10C, 10D, 10E, 10F, 10G, and 10H which are partial (partial laminated busbars). The partial laminated busbars 10A, 10B, 10C, 10D, 10E, 10F, 10G, and 10H are continuous with each other to form the entirety of the laminated busbar 10. In addition, the following specific example, a case where the conduction path 100 forms a power supply system transmission path and the distribution mechanism 20 serves as a power supply distribution portion will be described.

The device D1 such as an external power supply is connected to a first laminated busbar 10A. The laminated busbar 10A is equivalent to a portion of the laminated busbar 10 in which the number of stacks of the busbar 11 is maximum. The method of connecting the laminated busbar 10A and the device D1 may be, for example, any one of bolt fastening, various welding, and the like (the same also in the following).

The laminated busbar 10A branches off into a second laminated busbar 10B and a third laminated busbar 10C via the distribution mechanism 20A. Namely, in the distribution mechanism 20A, the laminated busbar 10A forming the branch origin laminated busbar 16 branches off into the laminated busbar 10B forming the branch destination laminated busbar 17, and the laminated busbar 10C. Here, two sheets of the bent branch busbars 11A are stacked to form the laminated busbar 10B, and a large number of the straight branch busbars 11B are stacked to form the laminated busbar 10C. Then, a device D2 which is a power supply target is connected to an end portion of the laminated busbar 10B.

The laminated busbar 10C branches off into the branch destination single-layer busbar 15 and a fourth laminated busbar 10D via the distribution mechanism 20B. Namely, in the distribution mechanism 20B, the laminated busbar 10C forming the branch destination laminated busbar 17 in the distribution mechanism 20A becomes the branch origin laminated busbar 16, and the laminated busbar 10C branches off into the branch destination single-layer busbar 15 and the laminated busbar 10D forming the branch destination laminated busbar 17. Here, one sheet of the bent branch busbar 11A forms the branch destination single-layer busbar 15, and a large number of the straight branch busbars 11B are stacked to form the laminated busbar 10D. Then, a device D3 which is a power supply target is connected to an end portion of the branch destination single-layer busbar 15.

The laminated busbar 10D branches off into a fifth laminated busbar 10E and a sixth laminated busbar 10F via the distribution mechanism 20C. Namely, in the distribution mechanism 20C, the laminated busbar 10D forming the branch destination laminated busbar 17 in the distribution mechanism 20B becomes the branch origin laminated busbar 16, and the laminated busbar 10D branches off into the laminated busbar 10E forming the branch destination laminated busbar 17, and the laminated busbar 10F. Here, four sheets of the bent branch busbars 11A are stacked to form the laminated busbar 10E, and a large number of the straight branch busbars 11B are stacked to form the laminated busbar 10F. Then, a device D4 which is a power supply target is connected to an end portion of the laminated busbar 10F.

The laminated busbar 10E branches off into a seventh laminated busbar 10G and an eighth laminated busbar 10H via the distribution mechanism 20D. Namely, in the distribution mechanism 20D, the laminated busbar 10E forming the branch destination laminated busbar 17 in the distribution mechanism 20C becomes the branch origin laminated busbar 16, and the laminated busbar 10E branches off into the laminated busbar 10G forming the branch destination laminated busbar 17, and the laminated busbar 10H. Here, two sheets of the bent branch busbars 11A are stacked to form the laminated busbar 10G, and two sheets of the straight branch busbars 11B are stacked to form the laminated busbar 10H. Then, a device D5 which is a power supply target is connected to an end portion of the laminated busbar 10G, and a device D6 which is a power supply target is connected to an end portion of the laminated busbar 10H.

Incidentally, here, bending is performed in the distribution mechanism 20A such that the bent branch busbars 11A forming the laminated busbar 10B are folded approximately 90° in the thickness direction with respect to the straight branch busbars 11B forming the laminated busbar 10C and are twisted approximately 90° around an axis along the thickness direction. Similarly, bending is performed in the distribution mechanism 20B such that the branch destination single-layer busbar 15 is folded approximately 90° in the thickness direction with respect to the straight branch busbars 11B forming the laminated busbar 10D and is twisted approximately 90° around an axis along the thickness direction. In contrast, bending is performed in the distribution mechanism 20C such that the bent branch busbars 11A forming the laminated busbar 10E are folded approximately 90° in the thickness direction with respect to the straight branch busbars 11B forming the laminated busbar 10F and are not twisted. Similarly, bending is performed in the distribution mechanism 20D such that the bent branch busbars 11A forming the laminated busbar 10G are folded approximately 90° in the thickness direction with respect to the straight branch busbars 11B forming the laminated busbar 10H and are not twisted. In this manner, in each of the distribution mechanisms 20, it is possible to suitably adjust the connection angle of each of the busbars 11 with respect to the device D by appropriately adjusting the fold angle or twist angle of the bent branch busbar 11A with respect to the straight branch busbar 11B.

In addition, the laminated busbar 10A, the laminated busbar 10C, the laminated busbar 10D, and the laminated busbar 10F are formed of the straight branch busbars 11B and here, continue straight. For example, the laminated busbar 10A, the laminated busbar 10C, the laminated busbar 10D, and the laminated busbar 10F may form main lines extending along a vehicle front and rear direction (entire length direction) of the vehicle V. In contrast, the laminated busbar 10B, the laminated busbar 10E, the laminated busbar 10G, the laminated busbar 10H, and the branch destination single-layer busbar 15 are formed of the bent branch busbars 11A. The bent branch busbars 11A are bent to branch off from the straight branch busbars 11B, so that the laminated busbar 10B, the laminated busbar 10E, the laminated busbar 10G, the laminated busbar 10H, and the branch destination single-layer busbar 15 are formed. The laminated busbar 10B, the laminated busbar 10E, the laminated busbar 10G, the laminated busbar 10H, and the branch destination single-layer busbar 15 may form branch lines with respect to the foregoing main lines.

In the conduction system 1 described above, the laminated busbar 10 is formed by stacking the plurality of busbars 11 forming the conduction path 100 in the vehicle V. Then, in the distribution mechanism 20 of the conduction system 1, a part of the busbars 11 forming the laminated busbar 10 is bent with respect to other busbars 11, and the part of the busbars 11 and the other busbars 11 branch off from each other to distribute an electric power or electric signal. Namely, in the distribution mechanism 20 of the conduction system 1, it is possible to cause a part of the busbars 11 and other busbars 11 to branch off from each other by bending the part of the busbars 11 forming the laminated busbar 10 with respect to the other busbars 11 without using a joining member such as a connector or a fastening bolt. According to this configuration, in the conduction system 1, a structure where a conduction path branches off from the conduction path 100 to distribute an electric power or electric signal to the device D can be simply and freely formed by the distribution mechanism 20. As a result, in the conduction system 1, the conduction path 100 can be properly provided in the vehicle V by combining the laminated busbar 10 and the distribution mechanism 20.

In addition, in the conduction system 1 described above, at least a part or, typically, all of the plurality of stacked busbars 11 are in contact with the busbars 11 adjacent thereto to conduct electricity, so that the laminated busbar 10 is formed. According to this configuration, the conduction system 1 can be configured to easily cope with demands such as an increase in the current of the vehicle V and an increase in the cross-section of the conduction path 100. Moreover, in the conduction system 1, as described above, the conduction path 100 can be properly provided in the vehicle V by combining the laminated busbar 10 and the distribution mechanism 20.

Furthermore, in the conduction system 1 described above, when the distribution mechanism 20 distributes an electric power, the number of the busbars 11 which are bent to branch off and the number of the busbars 11 which branch off without being bent are determined according to the current value required by a distribution destination of the electric power. According to this configuration, in the conduction system 1, the cross-sectional area of a conduction path which branches off from the conduction path 100 is adjusted by adjusting the number of the busbars 11 which branch off in the distribution mechanism 20; and thereby, it is possible to realize a proper current value required by the distribution destination of the electric power. Also in this regard, in the conduction system 1, the structure where a conduction path branches off from the conduction path 100 to distribute an electric power to the device D can be simply and freely formed by the distribution mechanism 20.

In addition, the conduction system 1 described above can be also configured such that the laminated busbar 10 includes the branch destination laminated busbar 17 which branches off via the distribution mechanism 20 and the branch destination laminated busbar 17 further branches off via another distribution mechanism 20. According to this configuration, in the conduction system 1, the laminated busbar 10 can branch off in multiple stages via a plurality of the distribution mechanisms 20; and thereby, it is possible to further improve the degree of freedom of a branch path of the conduction path 100. As a result, in the conduction system 1, the conduction path 100 can be properly provided in the vehicle V by combining the laminated busbar 10 and the distribution mechanisms 20.

Furthermore, in the conduction system 1 described above, the laminated busbar 10 may be configured to include the path restriction portion 13 and the deformation allowance portion 14. In this case, in the conduction system 1, the path restriction portion 13 and the deformation allowance portion 14 in the laminated busbar 10 are properly used according to the installation position or the like in the vehicle V, and thus it is possible to realize a balance between proper flexibility and proper rigidity required by each portion. Accordingly, in the conduction system 1, as described above, even when the laminated busbar 10 flows a large current and has a large cross-section, it is possible to secure good installation workability, good handleability, or the like. For example, in the conduction system 1, the path restriction portion 13 in the laminated busbar 10 has a relatively high rigidity, and thus the part of the path restriction portion 13 has a relatively good shape-retaining function. According to this configuration, the conduction system 1 can have a structure where owing to the part of the path restriction portion 13, the laminated busbar 10 easily maintains the shape corresponding to the installation path of the conduction path 100 in the vehicle V. On the other hand, in the conduction system 1, the deformation allowance portion 14 in the laminated busbar 10 has a relatively high flexibility, and thus the part of the deformation allowance portion 14 has a relatively good shape-deforming function. According to this configuration, in the conduction system 1, the laminated busbar 10 can flexibly cope with a change or fine adjustment in the installation path of the conduction path 100 owing to the part of the deformation allowance portion 14. For example, when the conduction system 1 is assembled into the vehicle V or is connected to each part, since the deformation allowance portion 14 is deformed, it is possible to absorb various tolerances; and thereby, it is possible to improve the mountability with respect to the vehicle V. Furthermore, in the conduction system 1, the part of the deformation allowance portion 14 in the laminated busbar 10 is deformed, and thus it is possible to improve the workability when various works such as packaging, transportation, and installation are done. As a result, in the conduction system 1, the laminated busbar 10 can maintain the shape corresponding to the installation path of the conduction path 100 owing to the path restriction portion 13, and also can secure the mobility owing to the deformation allowance portion 14. Then, in the conduction system 1 of the present embodiment, it is possible to secure good installation workability, good handleability, or the like under such a premise, and it is possible to properly provide the conduction path 100 in the vehicle V by combining the laminated busbar 10 and the distribution mechanism 20.

Incidentally, the foregoing conduction system according to the embodiment of the present invention is not limited to the foregoing embodiment, and various changes can be made without departing from the scope described in the claims.

In the above description, typically, the plurality of busbars 11 forming the laminated busbar 10 are made of the same material and are formed such that the cross-sections orthogonal to the extension direction have the same shape; however, the present invention is not limited thereto. The plurality of busbars 11 which form the laminated busbar 10 and are made of different materials may be mixed, and the plurality of busbars 11 having different thicknesses T or different widths W may be mixed. In this case, for example, in addition to the plurality of busbars 11 forming the laminated busbar 10 being formed into the shape of a thin sheet (foil shape) having flexibility, a thick plate-shaped busbar 11 which is formed to have a relatively high rigidity and form a rigid core (rigid core portion) of the laminate body may be mixed.

In the above description, the laminated busbar 10 is formed such that all of the busbars 11 forming the laminated busbar 10 are in contact with the busbars 11 adjacent thereto to conduct electricity and all of the busbars 11 forming the laminated busbar 10 have the same electrical potential; however, the present invention is not limited thereto. For example, the configuration where the insulation coating portion 12 is provided not to be interposed between the busbars 11 adjacent to each other in the plurality of stacked busbars 11 has been described; however, the present invention is not necessarily limited to the configuration. In addition, the insulation coating portion 12 may not be provided at all.

In the above description, the laminated busbar 10 may be configured to include the path restriction portion 13 and the deformation allowance portion 14; however, the present invention is not limited thereto.

The distribution mechanism 20 described above may be configured such that not only a part of the busbars 11 is bent with respect to other busbars 11, so that two branch paths are formed, but also a plurality of parts of the busbars 11 are bent in different directions with respect to other busbars 11, so that three or more branch paths are formed.

The conduction system according to the present embodiment may be configured by appropriately combining components in the foregoing embodiment and modification examples.

In the conduction system according to the present embodiment, the laminated busbar is formed by stacking the plurality of busbars forming the conduction path in the vehicle. Then, in the conduction system, in the distribution mechanism, a part of the busbars forming the laminated busbar is bent with respect to other busbars, and the part of the busbars and the other busbars branch off from each other to distribute an electric power or electric signal. As a result, the conduction system can provide an effect that the conduction path can be properly provided by combining the laminated busbar and the distribution mechanisms.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conduction system comprising:
a laminated busbar including a plurality of busbars that form a conduction path in a vehicle and are stacked with each other; and
a plurality of distribution mechanisms, each of the distribution mechanisms is configured to distribute an electric power or electric signal by bending a part of a few of the plurality of busbars forming the laminated busbar with respect to other busbars and by branching off the part of the few of the plurality of busbars and the other busbars from each other, wherein
the laminated busbar includes a branch destination laminated busbar that branches off via the distribution mechanism, and is formed by stacking the part of the few of the plurality busbars, and
the branch destination laminated busbar further branches off via another distribution mechanism.

2. The conduction system according to claim 1, wherein in the laminated busbar, at least a part of the plurality of busbars forming the laminated busbar is in contact with an adjacent busbar thereto to conduct electricity.

3. The conduction system according to claim 1, wherein the distribution mechanism distributes an electric power, and a number of the bended busbars and a number of the other busbars are determined according to a current value required by a distribution destination of the electric power.

4. The conduction system according to claim 2, wherein the distribution mechanism distributes an electric power, and a number of the bended busbars and a number of the other busbars are determined according to a current value required by a distribution destination of the electric power.

5. The conduction system according to claim 1, wherein the laminated busbar includes a path restriction portion in which at least a part of the plurality of busbars forming the laminated busbar is non-displaceable relative to the busbar adjacent thereto, and a deformation allowance portion in which at least a part of the plurality of busbars forming the laminated busbar is displaceable relative to the busbar adjacent thereto,
the path restriction portion has a higher rigidity than that of the deformation allowance portion, to restrict an installation path of the laminated busbar, and
the deformation allowance portion has a higher flexibility than that of the path restriction portion, to allow a deformation of the laminated busbar.

6. The conduction system according to claim 2, wherein the laminated busbar includes a path restriction portion in which at least a part of the plurality of busbars forming the laminated busbar is non-displaceable relative to the busbar adjacent thereto, and a deformation allowance portion in which at least a part of the plurality of busbars forming the laminated busbar is displaceable relative to the busbar adjacent thereto,
the path restriction portion has a higher rigidity than that of the deformation allowance portion, to restrict an installation path of the laminated busbar, and
the deformation allowance portion has a higher flexibility than that of the path restriction portion, to allow a deformation of the laminated busbar.

7. The conduction system according to claim 3, wherein the laminated busbar includes a path restriction portion in which at least a part of the plurality of busbars forming the laminated busbar is non-displaceable relative to the busbar adjacent thereto, and a deformation allowance portion in which at least a part of the plurality of busbars forming the laminated busbar is displaceable relative to the busbar adjacent thereto,
the path restriction portion has a higher rigidity than that of the deformation allowance portion, to restrict an installation path of the laminated busbar, and
the deformation allowance portion has a higher flexibility than that of the path restriction portion, to allow a deformation of the laminated busbar.

8. The conduction system according to claim 4, wherein the laminated busbar includes a path restriction portion in which at least a part of the plurality of busbars forming the laminated busbar is non-displaceable relative to the busbar adjacent thereto, and a deformation allowance portion in which at least a part of the plurality of busbars forming the laminated busbar is displaceable relative to the busbar adjacent thereto,
the path restriction portion has a higher rigidity than that of the deformation allowance portion, to restrict an installation path of the laminated busbar, and
the deformation allowance portion has a higher flexibility than that of the path restriction portion, to allow a deformation of the laminated busbar.

\* \* \* \* \*